Aug. 6, 1957
M. MAMON
2,802,165
BATTERY CHARGER AND CIRCUIT THEREFOR
Filed June 11, 1954
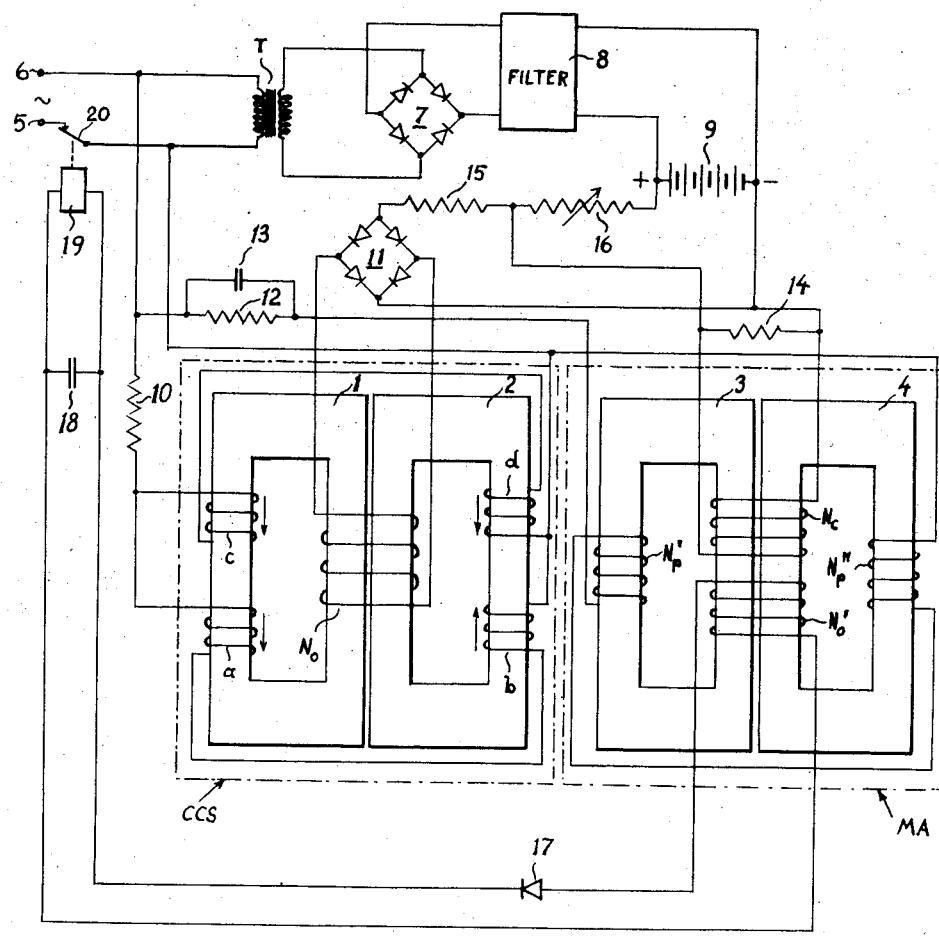
MICHEL MAMON
INVENTOR
BY
AGENT United States Patent Office 2,802,165
Patented Aug. 6, 1957

2,802,165
BATTERY CHARGER AND CIRCUIT THEREFOR

Michel Mamon, New York, N. Y., assignor of forty percent to George A. Rubissow, New York, N. Y.

Application June 11, 1954, Serial No. 436,015

6 Claims. (Cl. 320—40)

This invention relates to a new circuit for a battery charger and a physical embodiment of such battery charger, comprising a magnetic amplifier in combination with a magnetic current reference unit and with other secondary elements as hereinafter described.

In reference to the magnetic amplifier used therein, this invention is a continuation in part of the applications for U. S. Letters Patent Serial No. 366,161, filed July 6, 1953 and now abandoned, and Serial No. 401,553, filed December 31, 1953; and in regard to the magnetic current reference unit, also called constant-current source, it is a continuation-in-part of applications for U. S. Letters Patent Serial No. 378,980, filed September 8, 1953, and Serial No. 419,677, filed March 30, 1954.

This invention will be more fully understood from the following description and the appended drawing, given by way of example but not limiting this invention thereto.

The main object of this invention is to provide a reliable battery charger and a circuit therefor, in particular for special-type batteries in which the maximum charging voltage is very critical and should be kept at a predetermined exact value. Still a further object of this invention is to provide a static charger comprising a combination of magnetic amplifier, a magnetic current reference, and other secondary elements, including at least one relay or cut-off means for automatic cutoff of the charging operation herein described. Such a battery charger will be a tubeless charger which, regardless of large line voltage fluctuations and/or line frequency variations, will charge a battery up to a pre-set voltage, i. e. voltage representing the desired amount of charge of such battery, and thus provides a safety factor to prevent an overcharging of such battery and thereby increases its life considerably.

One embodiment of this invention is shown in the side figure of the drawing, wherein alternating-current input terminals 5, 6 supply power to a transformer T, the secondary of which contains a full-wave bridge 7, an optional filter 8, a battery 9, a constant-current source generally designated CCS and shown in dot-dash outline at lower left in the drawing, and a magnetic amplifier generally designated MA and shown in dot-dash outline at lower right in the drawing.

The constant-current source CCS comprises two preferably equally rated saturable magnetic cores 1 and 2, of toroidal structure. Each of said cores 1 and 2 is wound with two primary windings $a$, $b$, and $c$, $d$, respectively. Windings $a$ and $b$ are equally rated and interconnected in series-opposing, while windings $c$ and $d$ are equally rated but interconnected in series-aiding, as indicated by the arrows for a particular half-cycle of the input current. Windings $a$ and $b$ are connected in parallel to windings $c$ and $d$, and their common points are connected to input terminals 5 and 6 through a current-limiting resistor 10. Around both cores 1 and 2 is wound an output winding $N_0$, across the terminals of which a full-wave bridge rectifier 11 is connected. This invention is not limited to the use of a full-wave bridge rectifier 11; a half-wave rectifier or any combination of half-wave rectifier with capacitor to provide higher voltage output may be used.

The magnetic amplifier MA consists of saturable magnetic cores 3 and 4, preferably of high-permeability material and equally rated, each wound with a primary winding $N_p'$, $N_p''$ equally rated on both cores and interconnected in series-opposing to the terminals 5 and 6 through a current limiting resistor 12; around both cores 3 and 4 there are two further windings: control winding $N_c$ and output winding $N_o'$.

The principle of operation of the magnetic amplifier MA was described in my above-mentioned abandoned application Serial No. 366,661 and pending application Serial No. 401,553.

The principle of operation of the constant-current source CCS was described in my above-mentioned applications Serial No. 378,980 and Serial No. 419,677.

According to this invention, the cores 3 and 4, primary windings $N_p'$, $N_p''$ and the current-limiting resistor 12 are so designed that these cores are fully saturated when connected to alternating-current terminals 5 and 6. The control winding $N_c$ of the magnetic amplifier is preferably bridged by a low-impedance shunt 14; the battery 9 supplies a current through this shunt 14 through a resistor 16; the constant-current source CCS supplies a fixed bias current through the same shunt 14 but in the opposite direction to the current supplied by the battery 9. The value of the bias current is adjusted by the resistor 15. The output winding $N_o'$ of magnetic amplifier MA is connected across a half-wave rectifier 17 in series with a relay coil 19 shunted by a capacitor 18. The values of resistors 15 and 16 are chosen so that the output current of the magnetic amplifier MA in the relay coil 19 will be a fraction of the operating relay coil current, for all values of battery voltage up to the critical predetermined cut-off voltage. With a slight increase in this critical cut-off voltage, the magnetic amplifier MA will send through the relay coil 19 a current whose value will be higher than the operating threshold of the relay coil. Thus the contact 20 of the relay 19 will then break the connection between battery 9 and terminals 5 and 6.

It can be shown that the current through control winding $N_c$ will be at or near zero as long as the battery voltage approximately matches the voltage across the output diagonal of rectifier bridge 11 but that this control current will assume appreciable values of one or the other polarity if the battery voltage is considerably greater than the bridge voltage (battery fully charged) or is considerably less (battery dead); thus in both of the two last-mentioned instances the charging current through rectifier bridge 7 will be cut off by the operation of circuit breaker relay 19.

The invention described in the present application for Letters Patent is not limited to the use of a battery, and can be applied wherever it is necessary to protect an electrical and/or electro-mechanical system from an over-voltage, and this for a purpose other than charging.

What I claim is:

1. A battery charger comprising a source of alternating current, rectifier means connected across said source and provided with output terminals connectable across a battery to be charged, a generator of constant direct current connected across said source, a magnetic amplifier provided with a control winding so connected to said output terminals and to said generator as to be differentially traversed by the currents thereof, and circuit breaker means controlled by said magnetic amplifier for disconnecting said source from said battery in response to the difference of said currents exceeding a predetermined value.

2. A battery charger according to claim 1, wherein said generator comprises a pair of saturable magnetic cores, a first pair of windings on one of said cores connected in aiding relationship across said source, a second pair of windings on the other of said cores connected in opposed relationship across said source, output winding means on both of said cores, and other rectifier means connected to be energized from said output winding means.

3. A battery charger according to claim 1, wherein said magnetic amplifier comprises a pair of saturable magnetic cores, a pair of input windings connected across said source in mutually opposed relationship with reference to said control winding, said control winding surrounding both of said cores, and an output winding wound on both of said cores in the same sense as said control winding, said circuit breaker means being connected to be energized from said output winding.

4. A battery charger according to claim 3, wherein said source is arranged to drive said cores to full saturation.

5. A battery charger according to claim 1, further comprising first and second resistor means serially connected between said control winding on the one hand and said output terminals and said generator, respectively, on the other hand.

6. A battery charger according to claim 5, further comprising shunt resistor means connected across said control winding, the resistance of said shunt resistor means being substantially less than that of said first and second resistor means.

References Cited in the file of this patent

UNITED STATES PATENTS

| | | |
|---|---|---|
| 2,029,628 | Lord | Feb. 4, 1936 |
| 2,316,331 | Hedding | Apr. 13, 1943 |
| 2,675,515 | Blashfield | Apr. 13, 1954 |
| 2,678,419 | Bennett | May 11, 1954 |

FOREIGN PATENTS

| | | |
|---|---|---|
| 897,168 | France | May 15, 1944 |